US005087059A

United States Patent [19]

Terwilliger

[11] Patent Number: 5,087,059

[45] Date of Patent: Feb. 11, 1992

[54] TOOL FOR INSTALLING OR REMOVING A COLLET HEAD

[75] Inventor: Donald N. Terwilliger, Millerton, Pa.

[73] Assignee: Hardinge Brothers, Inc., Elmira, N.Y.

[21] Appl. No.: 541,793

[22] Filed: Jun. 21, 1990

[51] Int. Cl.$^5$ .................. B23B 31/06

[52] U.S. Cl. .................. 279/1 ME; 279/1 R; 279/46 R

[58] Field of Search .................. 279/1 R, 1 ME, 46 R, 279/35-37, 106-109

[56] References Cited

U.S. PATENT DOCUMENTS

| | | | |
|---|---|---|---|
| 2,109,740 | 3/1938 | Carlborg | 29/261 |
| 2,219,008 | 10/1940 | Drissner | 279/46 |
| 2,535,951 | 12/1950 | Parigian | 279/46 |
| 2,834,100 | 5/1958 | Harsh | 29/261 |
| 3,402,455 | 9/1968 | Converse | 29/261 |
| 3,579,795 | 5/1971 | Burman | 29/252 |
| 3,990,139 | 11/1976 | Touchet | 29/261 |
| 4,214,766 | 7/1980 | Rall et al. | 279/46 R |
| 4,858,938 | 8/1989 | Terwilliger et al. | 279/57 |

*Primary Examiner*—Steven C. Bishop

*Attorney, Agent, or Firm*—Shlesinger Arkwright & Garvey

[57] ABSTRACT

A tool for installing or removing a collet head, which has a plurality of spring loaded collet segments, from a collet body, comprises a body having an axis, a base and a skirt extending from the base. A member is operably secured to the body and axially movable relative thereto. A plurality of arms are pivotally secured at each of one of their end portions to each one of a plurality of recesses disposed in the skirt. The other end portion of each arms is movably secured to one end of the member such that when the member moves axially, the other end of each of the arms move with the member while the one end of each of the arms pivots in the recesses. A pin is operably associated with each arm for cooperating with its respective hole in the collet head such that each pin moves radially relative to the axis when the member moves axially relative to the body, whereby the collet head is compressed or expanded for engaging or disengaging the collet head from the collet body.

25 Claims, 2 Drawing Sheets

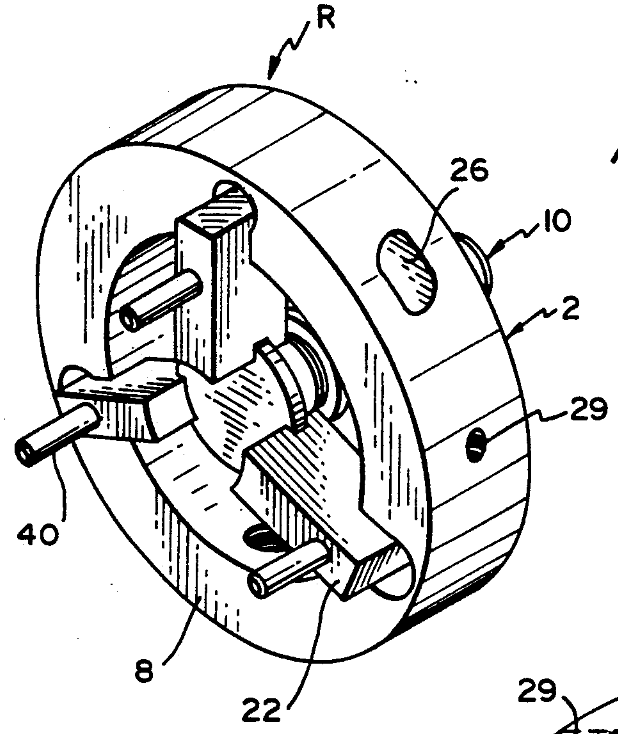
FIG_1
FIG_2
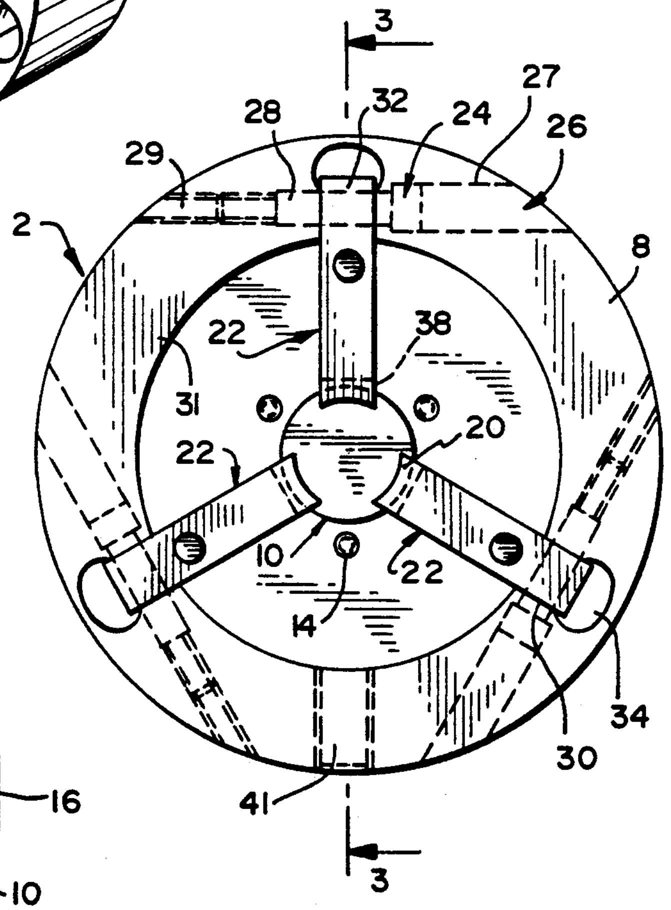
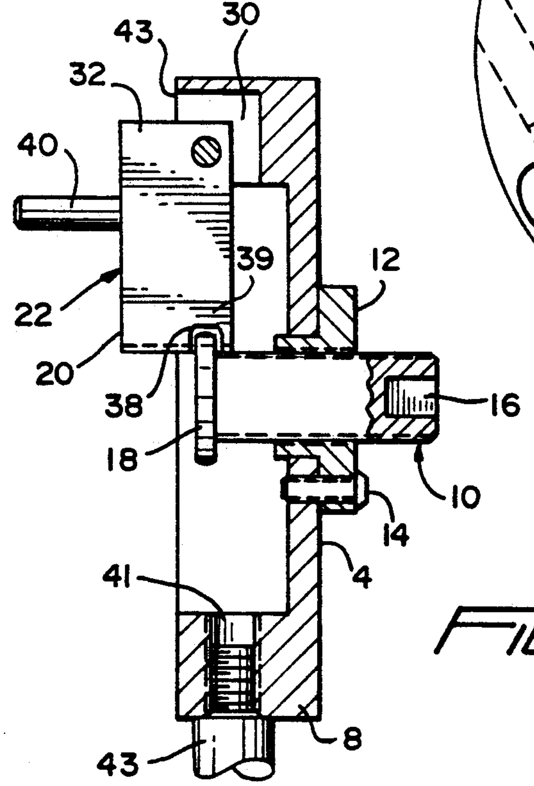
FIG_3

TOOL FOR INSTALLING OR REMOVING A COLLET HEAD

FIELD OF THE INVENTION

The present invention relates generally to a tool for installing or removing a machine collet and relates particularly to a tool for installing or removing a collet head from a collet body wherein the collet head includes a plurality of segments held together by resilient means.

BACKGROUND OF THE INVENTION

Collets are normally used in lathe machines for holding work stocks, usually bars or rods stocks, for machining. A two-piece collet comprises a tubular body and a collet head. The rear portion of the collet head is secured to one end of the tubular body. The collet head normally comprises a plurality of segments held together by resilient means, such as rubber inserts, as disclosed in U.S. Pat. No. 4,858,938, hereby incorporated by reference. The collet head is installed or removed relative to its tubular body by appropriately compressing the collet head at its rear portion such that the collet head may be inserted into the collet body and be secured to a securing means. Removal of the collet head is performed in a similar fashion by compressing the collet head rear portion until it disengages.

The need for installing or removing a collet head may occur several times during production. When the need arises, it is advantageous to minimize the resulting downtime by using a tool to speed up the installation or removal operation.

OBJECTS AND SUMMARY OF THE INVENTION

It is therefore an Object of the present invention to provide a tool for efficiently installing or removing a collet head from a collet body.

It is another object of the present invention to provide a tool that is manually actuated for installing or removing a collet head from a collet body.

It is still another object of the present invention to provide a tool that is operated by a pressurized fluid for installing or removing a collet head from a collet body.

It is yet another object of the present invention to provide a tool that is relatively lighter for facilitating engagement of the tool with a collet head for installing or removing the collet head from a collet body.

It is an object of the present invention to provide a tool that is relatively simple to manufacture and has relatively few number of parts for installing or removing a collet head from a collet body.

In summary, the present invention provides a tool for efficiently minimizing the time involved in installing or removing a collet head from a collet body.

These and other objects of the present invention will become apparent from the following detailed description.

BRIEF DESCRIPTIONS OF THE DRAWINGS

FIG. 1 is a front perspective view of a tool according to the present invention.

FIG. 2 is a front view of the tool shown in FIG. 1.

FIG. 3 is a cross-sectional view taken along line 3—3 in FIG. 2, with some parts deleted for clarity and with portions shown broken away.

DETAILED DESCRIPTION OF THE INVENTION

Figure 4:
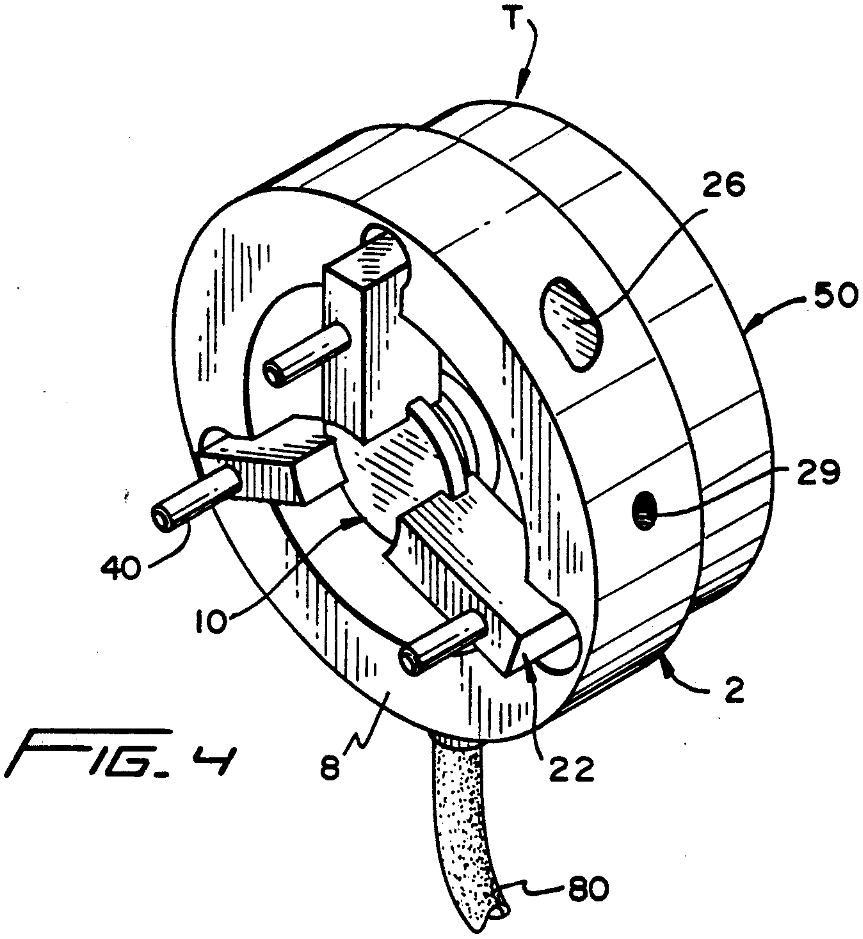
FIG. 4 is a front perspective view of another embodiment of a tool according to the present invention.

An embodiment of a tool R in accordance with the present invention is disclosed in FIGS. 1 through 3. The tool R includes a cylindrical body 2 with a base 4 and a skirt 8 extending therefrom, as best shown in FIG. 3.

The body 2 is preferably made of lightweight material such as aluminum, with the rest of the tool R being preferably made of high strength material, such as steel.

A threaded member 10 is centrally and axially secured to the body 2 through a threaded insert 12 that is secured to the body 2 by threaded fastening means 14, as best shown in FIG. 3.

The member 10 cooperates with the insert 12 such that rotation of the member 10 causes the member 10 to move axially relative to the body 2. The member 10 has a square recess 16 adapted to receive a standard ratchet wrench, or other means, for turning the member 10.

A flange portion 18 is disposed at the other end of the member 10 and is movably engaged with each end portion 20 of a plurality of arms 22.

Each of the arms 22 is pivotally secured to the body 2 with a bolt 24 that is threadedly secured in each of plurality of holes 26. Each of the holes 26 traverses the skirt 8 in a chord and includes a counterbore 27 and a threaded portion 29. This arrangement advantageously permits each of the bolts 24 to be adequately tightened in each respective hole 26. The skirt 8 advantageously provides a rigid structure for each bolt 24 to withstand the stresses imposed thereon during use.

Each of the arms 22 is disposed radially and equidistantly from each other, as best shown in FIG. 2.

Each of the bolts 24 includes a smooth shank portion 28 that provides a bearing surface for each arm 22 for minimizing wear and tear during operation. Each of the bolts 24 has a socket head adapted to engage a socket tool, such as a hex key, thereby permitting each bolt 24 to be countersunk into the skirt 8.

A number of recesses 30 are disposed radially in an inner portion 31 of the skirt 8 for receiving the pivoting end portion 32 of each arm 22. Each of the recesses 30 has an enlarged end portion 34 for providing adequate clearance for each end portion 34 of the respective arms 22 when pivoting. The other end portion 20 of each arm 22 includes a slot 38 for movably engaging the flange portion 18 of the member 10 such that each arm 22 is free to pivot about its respective bolt 24 when the member 10 is threadedly moved axially in either direction. Each of the slots 38 is disposed in a lower corner portion 39 of the end portion 20 of each arm 22.

A pin 40 is carried by each arm 22 and disposed substantially transversely thereto for insertion into a corresponding hole disposed on each segment of a collet head (not shown). Each of the pins 40 is used to secure the arms 22 to the collet head, thereby transferring the pivoting motion of each arm 22 to the collet head. A person of ordinary skill in the art will understand that other structures can be used to effect the same function.

Each of the arms 22 is disposed in the body 2 in such a way that a substantial portion of each arm protrudes beyond an outer edge 43 of the body 2, as best shown in FIGS. 1 and 3. This advantageously provides the pins 40 with adequate clearance to engage the collet head.

A threaded hole 41 is adapted to receive a handle 43 for restraining the tool R while the member 10 is turned with a ratchet wrench.

In operation, the tool R is engaged with a collet head by inserting each of the pins 40 into their respective holes in the collet head. By turning the member 10 with a ratchet wrench or with other conventional drive means in a direction such that the flange portion 18 is drawn into the body 2, each of the arms 22 is caused to pivot about its respective bolt 24 in a counterclockwise direction, as viewed in FIG. 3. The pivoting motion of each arm 22 causes each of the pins 40 to move inwardly towards the axis of the tool R. This action in turn compresses the rear portion of the collet head to facilitate disengagement of the collet head from the collet body (not shown).

Installation of the collet head to the collet body is done in a similar manner. The tool R is engaged with a collet head and its rear portion compressed by rotating the member 10 to thereby draw the arms 22 inwardly into the body 2. When the rear portion of the collet head is adequately compressed, the collet head is then positioned into the collet body. When properly positioned, the member 10 is then rotated in the opposite direction such that the arms 22 are pivoted away from the body 2. This action permits the rear portion of the collet head to expand, thereby permitting it to engage and lock into the collet body. The installation or removal of the collet head relative to the collet body is further described in U.S. Pat. No. 4,858,938, cited above.

Figure 5:
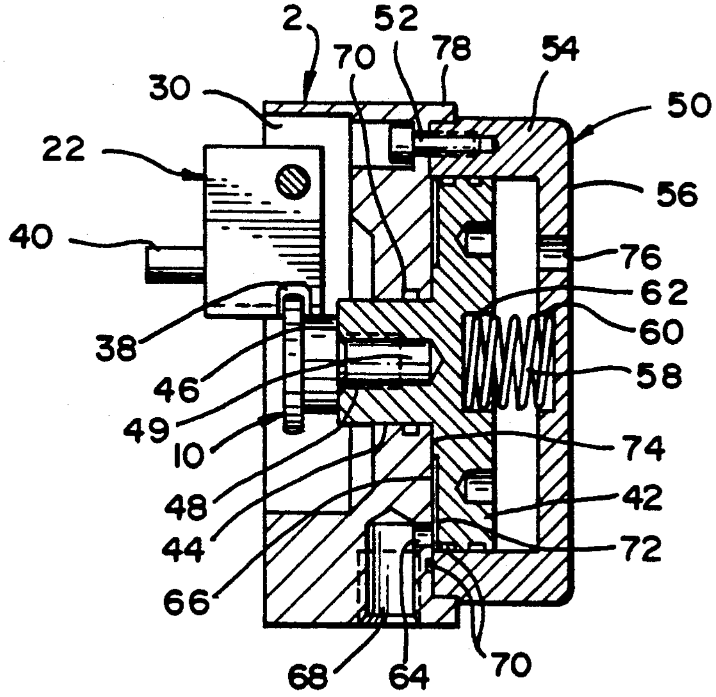
FIG. 5 is a cross-sectional, side elevational view of the tool shown in FIG. 4, with some parts deleted for clarity.

Another embodiment of the tool R is disclosed in FIGS. 4 and 5 and generally indicated as tool T. A piston 42 is slidably secured to the body 2 through an opening 44 in the body 2. The piston 42 has a stem portion 46 disposed transversely to the piston 46 and is slidably fitted in the opening 44. The member 10 is carried by the piston 42 in the stem portion 46 such that axial movement of the piston 42 causes corresponding axial movement of the member 10. The member 10 has a threaded portion 48 secured in a cooperating threaded hole 49 in the stem portion 46.

A cap 50 fits over the piston 42 and is secured to the body 2 by a plurality of bolts 52 along a wall portion 54 of the cap 50. The cap 50 is disposed over the piston 42 such that the cap base wall 56 is spaced from the piston 42 in order that the piston 42 is permitted to slide axially within the cap 50. A spring 58 disposed between the base wall 56 and the piston 42 for urging the piston 42 toward the body 2 is secured in cooperating recesses 60 and 62 disposed in the wall portion 56 and the piston 42, respectively.

A passageway 64 terminates on a surface 66 on the body 2 and communicates with a fitting hole 68. Resilient O-rings 70 provide sealing means for a chamber formed between the body 2 and the piston 42 when the piston 42 moves axially away from the body 2. An annular recess 72 on an inner surface 74 of the piston 42 defines a chamber with the body surface 66. The annular recess 72 communicates with the passageway 64 to provide initial even distribution of pressurized fluid on the piston surface 74 when pressurized fluid is applied to the passageway 64.

An opening 76 in the base wall portion 56 of the cap 50 provides means for equalizing the pressure inside the cap 54 with the outside when the piston 42 axially moves within the cap 50.

The skirt 8 of the body 2 includes an annular ridge 78 that provides a lateral lock for the cap 54.

In operation, pressurized fluid is introduced into the fitting hole 68 and into the passageway 64 by means of a hose 80 connected to a source of pressurized fluid (not shown). The pressurized fluid causes the piston 42 to move axially away from the body 2. The member 10 which is carried by the stem portion 46 of the piston 42 also moves axially in the same direction, thereby pivoting the arms 22 about their respective bolts 24. As described above in the operation of the tool R, the inward movement of the pins 40 which are engaged with the collet head, causes the rear portion of the collet head to be compressed, thereby facilitating the installation or removal of the collet head from the collet body.

The axial movement of the piston 42 away from the body 2 causes the spring 58 to be compressed. When the collet head has been properly positioned in the collet body or when the collet head has been removed from the collet body, pressurized fluid within the tool T is then relieved, causing the compressed spring 58 to push the piston 42 toward the body 2. This causes the arms 22 to pivot and the pins 40 to move away from the axis of the body 2, thereby relieving the compressive pressure on the rear portion of the collet head. When the body surface 66 and the piston inner surface 74 are abutting each other the collet head may then be disengaged from the tool T.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A tool for installing or removing a collet head, which has a plurality of spring loaded collet segments, from a collet body, said tool comprising:

a) a body having an axis;

b) said body including a base and a skirt extending from said base;

c) a member operably secured to said body and axially movable relative thereto;

d) a plurality of arms;

e) said skirt including a plurality of recesses;

f) one end of each of said arms being disposed within a respective one of said recesses and pivotally secured therein and the other end being movably secured to one end of said member such that when said member moves axially, the other end of each of said arms move with said member while the one end of each of said arms pivots in said recess; and g) means operably associated with said arms for securing said arms to the collet head such that when said member moves axially relative to said body, the resulting pivoting motion of said arms causes the collet head to be compressed or relaxed, whereby the collet head is engaged or disengaged from the collet body.

2. A tool as in claim 1, wherein:

a) said skirt includes a plurality of holes intersecting each of said recesses; and b) a pin disposed in each of said holes and operably secured with its respective arm.

3. A tool as in claim 2, wherein:
a) each of said holes is disposed in said skirt such as to define a chord.

4. A tool as in claim 1, wherein:
a) said one end of said member includes a flange portion; and
b) the other end of each of said arms includes a slot movably engaged with said flange portion.

5. A tool as in claim 4, wherein:
a) each of said arms include upper and lower corner portions;
b) each of said slots is disposed in said lower corner portion.

6. A tool as in claim 1, and further comprising:
a) a handle operably secured to said body.

7. A tool as in claim 6, wherein:
a) said body includes a hole for cooperating with said handle.

8. A tool as in claim 1, wherein:
a) said member includes threads;
b) an insert operably secured to said body; and
c) said insert includes a threaded hole for cooperating with said member threads.

9. A tool as in claim 8, and further comprising:
a) means for turning said member for thereby axially moving said member.

10. A tool as in claim 9, wherein:
a) said turning means includes a socket disposed at the other end of said member and adapted for securing a turning tool.

11. A tool as in claim 1, wherein:
a) said skirt includes an outer edge; and
b) a portion of each of said arms protrudes beyond said skirt outer edge.

12. A tool as in claim 1, wherein:
a) said securing means includes pin means for cooperating with respective holes in the collet head.

13. A tool as in claim 12, wherein:
a) said pin means are substantially transverse to their respective arms.

14. A tool as in claim 1, wherein:
a) each of said arms is disposed radially relative to said axis and disposed equidistantly from each other.

15. A tool as in claim 1, and further comprising:
a) piston/cylinder means for actuating said member.

16. A tool as in claim 15, wherein said piston cylinder means comprises:
a) a piston axially movable relative to said body;
b) a cap disposed over said piston and secured to said body such that said piston slides within said cap when said piston axially moves relative to said body, and
c) a passageway terminating between said piston and said body for permitting pressurized fluid to be admitted therebetween for thereby moving said piston axially relative to said body.

17. A tool as in claim 16, wherein:
a) said body includes a hole;
b) said piston includes a stem portion slidably disposed in said body hole; and
c) said member is operably secured to said stem portion.

18. A tool as in claim 16, wherein:
a) said cap includes a base wall; and
b) a resilient means disposed between said piston and said base wall for biasing said piston toward said body.

19. A tool as in claim 18, wherein:
a) said resilient means is a spring centrally disposed between said piston and said base wall of said cap.

20. A tool as in claim 16, wherein:
a) said piston includes an inner surface adjacent to said body; and
b) said piston surface includes an annular depression for forming a chamber with said body and communicating with said passageway.

21. A tool as in claim 16, wherein:
a) said cap base wall includes an opening communicating with the interior of said cap and the outside.

22. A tool as in claim 1, wherein:
a) each of said recesses includes an enlarged portion disposed away from said axis.

23. A tool as in claim 16, wherein:
a) said body includes an annular ridge; and
b) said cap includes an edge lockedly engaged with said ridge.

24. A tool as in claim 1, wherein:
a) said skirt includes inner and outer portions; and
b) said recesses are disposed on said skirt inner portion.

25. A tool for installing or removing a collet head, which has a plurality of spring loaded collect segments, from a collet body, said tool comprising:
a) a body having an axis;
b) said body including a base and a skirt extending from said base;
c) a member operably secured to aid body and axially movable relative thereto;
d) a plurality of arms;
e) a plurality of pivot means operably associated with said skirt;
f) one end of each of said arms being associated with a respective one of aid pivot means and the other end being movably secured to one end of said member such that when said member moves axially, the other end of each of said arms move with said member while the one end of each of said arms pivots relative to the respective pivot means; and
g) means operably associated with said arms for securing said arms to the collet head such that when said member moves axially relative to said body, the resulting pivoting motion of said arms causes the collet head to be compressed or relaxed, whereby the collet head is engaged or disengaged from the collet body.

* * * * *